US009470343B2

(12) United States Patent
Herro et al.

(10) Patent No.: US 9,470,343 B2
(45) Date of Patent: Oct. 18, 2016

(54) PIPE FOR A CONVEYING LINE FOR CONVEYING BULK MATERIAL AS WELL AS DEVICE FOR LEAKAGE MONITORING OF A CONVEYING LINE

(71) Applicant: Motan Holding GmbH, Constance (DE)

(72) Inventors: Reinhard Herro, Kempten (DE); Peter Haupt, Isny (DE); Karl Wolfgang, Leutkirch (DE)

(73) Assignee: Motan Holding GmbH, Constance (DE)

( * ) Notice: Subject to any disclaimer, the term of this patent is extended or adjusted under 35 U.S.C. 154(b) by 44 days.

(21) Appl. No.: 14/283,249

(22) Filed: May 21, 2014

(65) Prior Publication Data

US 2015/0337994 A1    Nov. 26, 2015

(51) Int. Cl.
| F16L 55/00 | (2006.01) |
| F16L 9/18 | (2006.01) |
| F16L 9/19 | (2006.01) |
| G01M 3/28 | (2006.01) |
| F16L 3/10 | (2006.01) |
| F16L 9/21 | (2006.01) |
| F16L 21/00 | (2006.01) |
| F16L 55/035 | (2006.01) |

(52) U.S. Cl.
CPC .............. *F16L 9/19* (2013.01); *F16L 3/1083* (2013.01); *F16L 9/18* (2013.01); *F16L 9/21* (2013.01); *F16L 21/005* (2013.01); *F16L 55/035* (2013.01); *G01M 3/283* (2013.01); *G01M 3/2815* (2013.01); *F16L 2201/30* (2013.01)

(58) Field of Classification Search
CPC .................................... F16L 7/00; F16L 7/02
USPC .................... 138/112, 113, 104, 109, 114
See application file for complete search history.

(56) References Cited

U.S. PATENT DOCUMENTS

| 4,182,378 | A | * | 1/1980 | Dieter ...................... F16L 7/00 138/112 |
| 4,417,603 | A | * | 11/1983 | Argy ..................... F16L 59/141 138/104 |
| 5,441,082 | A | * | 8/1995 | Eskew ...................... F16L 7/00 138/112 |
| 5,592,975 | A | * | 1/1997 | Wissmann ................ F16L 7/00 138/112 |
| 6,571,832 | B1 | * | 6/2003 | Elliott ....................... F16L 7/00 138/108 |
| 2007/0256750 | A1 | * | 11/2007 | Crook .................... E21B 17/105 138/113 |
| 2009/0084457 | A1 | * | 4/2009 | Tsuchie ..................... F16L 9/18 138/104 |
| 2011/0041934 | A1 | | 2/2011 | Holler |

FOREIGN PATENT DOCUMENTS

| DE |   1 072 946    | 1/1960 |
| DE |  42 07 029 A1  | 9/1993 |
| DE | 10 2008 021 201 A1 | 11/2009 |
| DE | 10 2011 119 635 A1 |  5/2013 |

* cited by examiner

*Primary Examiner* — Patrick F Brinson
(74) *Attorney, Agent, or Firm* — Gudrun E. Huckett (57) ABSTRACT

A pipe for a conveying line for conveying bulk material has an inner pipe and an exterior pipe surrounding at a spacing the inner pipe, wherein an annular space is formed between the inner pipe and the exterior pipe. A spacer is seated on the inner pipe and arranged in the annular space between the inner pipe and the exterior pipe. The spacer centers the inner pipe and the exterior pipe relative to each other. The spacer supports the exterior pipe by an at least 2-point support.

14 Claims, 12 Drawing Sheets

PIPE FOR A CONVEYING LINE FOR CONVEYING BULK MATERIAL AS WELL AS DEVICE FOR LEAKAGE MONITORING OF A CONVEYING LINE

BACKGROUND OF THE INVENTION

The invention concerns a pipe for a conveying line for conveying bulk material, comprising an inner pipe that is surrounded at a spacing by an exterior pipe and comprising at least one spacer which is arranged in an annular space between the inner pipe and the exterior pipe and centers the two pipes relative to each other.

The invention concerns moreover a device for leakage monitoring in a conveying line that is assembled of pipes, in particular as described above, comprising at least one inner pipe that is surrounded with formation of an annular space by at least one exterior pipe.

Conveying lines are known which are comprised of an inner pipe and an exterior pipe surrounding the former at a spacing. The annular space between the two pipes is filled with plastic material in order to separate the inner pipe acoustically from the exterior pipe (DE 42 07 029 A1).

In another known conveying line (DE 1 072 946), the annular space between the inner pipe and the exterior pipe is filled with a filling material in which the spacers in the form of steel tapes are embedded. The steel tapes serve for centering the exterior pipe relative to the inner pipe.

In conveying lines for fluids (DE 10 2008 021 201 A1), the annular space between the inner pipe and the exterior pipe is filled with an insulating material in order to keep the heat loss of the fluid along the transport path of the fluid as minimal as possible.

The invention has the object to design the pipe of the aforementioned kind and the device of the aforementioned kind in such a way that in use the conveying line assembled of the pipes has a relatively minimal noise level. In this context, possible leakage in the conveying line should be detectable in a simple and reliable way.

SUMMARY OF THE INVENTION

This object is solved according to the invention for the pipe of the aforementioned kind in that the exterior pipe is supported with at least one 2-point support on the spacer which is seated on the inner pipe (3).

This object is solved according to the invention for the device of the aforementioned kind in that along the conveying line annular spaces are distributed that each are closed off at both ends and each are monitored by at least one measuring device.

The pipe according to the invention is characterized in that the exterior pipe is supported by at least one 2-point support on the spacer that, in turn, is seated on the inner pipe. As a result of this point support, the annular space between the interior and the exterior pipe remains free. Accordingly, structure-borne sound is transmitted from the inner pipe only very minimally onto the exterior pipe so that the noise level in operation of the conveying line is significantly reduced. Since the spacer does not close off the annular space, the air volume that is provided in the annular space contributes also to noise reduction. The pipe can be manufactured in a simple way. Onto the inner pipe, an appropriate number of spacers, depending on the length, are attached spaced apart one behind the other. Subsequently, it is only required to push on the exterior pipe. The spacers ensure centering of the exterior pipe relative to the inner pipe. In this way, the pipes that form the conveying line can be manufactured in an inexpensive way. The double-wall pipes can be assembled to the conveying line in an assembly-friendly way.

Advantageously, the spacer is provided with an annular body with which it is seated on the inner pipe. In this way, the spacer can be attached reliably on the inner pipe.

It is advantageous when the annular body of the spacer is seated with elastic pretension on the inner pipe. In this way, it is ensured in a simple way that the spacer during operation of the conveying lines is not displaced on the inner pipe.

The point support of the exterior pipe on the spacer can be achieved in a preferred way very simply in that at least two projections are projecting from the annular body on which the exterior pipe is supported. In case of a 2-point support, these projections are positioned diagonally opposite each other. In case of more than two projections, they are distributed uniformly about the circumference of the annular body. The projections can be designed such that they terminate at the free end in the form of an edge with which the projection is contacting the inner wall of the exterior pipe. The free end of the projections can also be designed to be curved.

It is advantageous when the projections are provided such that they are resting with their free ends with radial pretension on the inner wall of the exterior pipe.

Between the projections of the annular body, passages are provided so that the annular space across its length is provided with a corresponding continuous air volume. In this way, an optimal noise reduction is achieved.

In order to improve the noise reduction even more, the spacer in a preferred way is comprised of rubber or an elastic material, for example, an appropriate plastic material.

In a preferred embodiment, the annular space is closed off at both ends. This results in an enclosed air volume which not only serves excellently for noise reduction in operation of the conveying line but also in an excellent way can be utilized for leakage monitoring of the inner pipe. As long as the inner pipe in the area of this closed-off annular space has no leak, the pressure and/or flow conditions in the annular space do not change. When the inner pipe however has a leak in the area of the closed-off annular space, this leads to a pressure change and/or a flow change which can be detected by appropriate measuring devices or sensors. In this way, in a simple but reliable way it is possible to localize and repair the leak of the inner pipe that, due to the double-wall configuration, cannot be detected from the exterior or to replace the corresponding pipe of the conveying line.

The annular space is advantageously closed off by annular plugs. At the ends of the annular space, they are contacting the inner wall of the exterior pipe as well as the exterior wall of the inner pipe in such a way that the annular space is air-tightly closed off. Such annular plugs can be comprised of rubber-like or elastic material, pressed in between the inner pipe and the exterior pipe so that the plugs with elastic pretension are resting on the inner pipe as well as on the exterior pipe.

In an advantageous embodiment, the inner pipe projects past the exterior pipe. The projecting part of the inner pipe can then be utilized for coupling neighboring pipes. The projecting part of the inner pipe is only so large that appropriate coupling means, such as pipe clamps or the like, can be mounted for connecting neighboring pipes.

In order to be able to detect a leak in the inner pipe in the area of the closed-off annular space, advantageously at least one pressure sensor is arranged in this annular space. Upon occurrence of a leak, the pressure in the annular chamber changes. When the medium in the inner pipe is conveyed, for example, with underpressure, a pressure reduction in the annular space occurs. When the medium in the inner pipe is conveyed at overpressure, then upon occurrence of a leak the pressure in the annular space increases. In both cases, the pressure change is detected by the pressure sensor. Advantageously, the signals of the pressure sensor are transmitted to a monitoring unit.

It is also possible to detect the occurrence of a leak in the inner pipe in the area of the annular space by means of a flow metering device. For this purpose, the exterior pipe in the area of the annular space is provided with at least one appropriate connector for such a flow metering device. When the inner pipe in the area of the annular space has a leak, the flow conditions in the annular space changes. The flow metering device sends a corresponding signal so that the leak can be localized in a simple way.

The device in accordance with the invention enables a very simple monitoring of the conveying line with regard to leakage. Across the length of the conveying line, annular spaces are distributed uniformly that, at both ends, are closed off. By means of the measuring devices, each annular space is monitored so that a leak in the inner pipe in the area of these annular spaces can be determined and indicated.

Advantageously, the measuring device is a pressure sensor which is arranged in the annular space. When the inner pipe in the area of the corresponding annular space has a leak, the pressure conditions in the annular space change so that the pressure sensor delivers a corresponding signal.

The measuring device can also be a flow metering device which detects a leakage flow in the respective annular space. When the inner pipe has a leak in the area of the corresponding annular space, a corresponding leakage flow occurs which can be detected by the flow metering device.

In an advantageous embodiment, the annular spaces can be in flow communication with each other by conduits.

The features disclosed in the dependent claims further develop the subject matter of the respective independent claim. This is however not to be understood as giving up rights on claiming independently the features of these dependent claims.

Further features of the invention result from the further claims, the description, and the drawings.

BRIEF DESCRIPTION OF THE DRAWINGS

The invention will be explained in more detail with the aid of embodiments illustrated in the drawings. It is shown in.

DESCRIPTION OF PREFERRED EMBODIMENTS

With the conveying device a medium, in particular plastic material in granular form, is conveyed by using a pressure flow or suction flow. For example, with the conveying line the medium is conveyed from a storage container to a processing machine for the medium.

Figure 1:
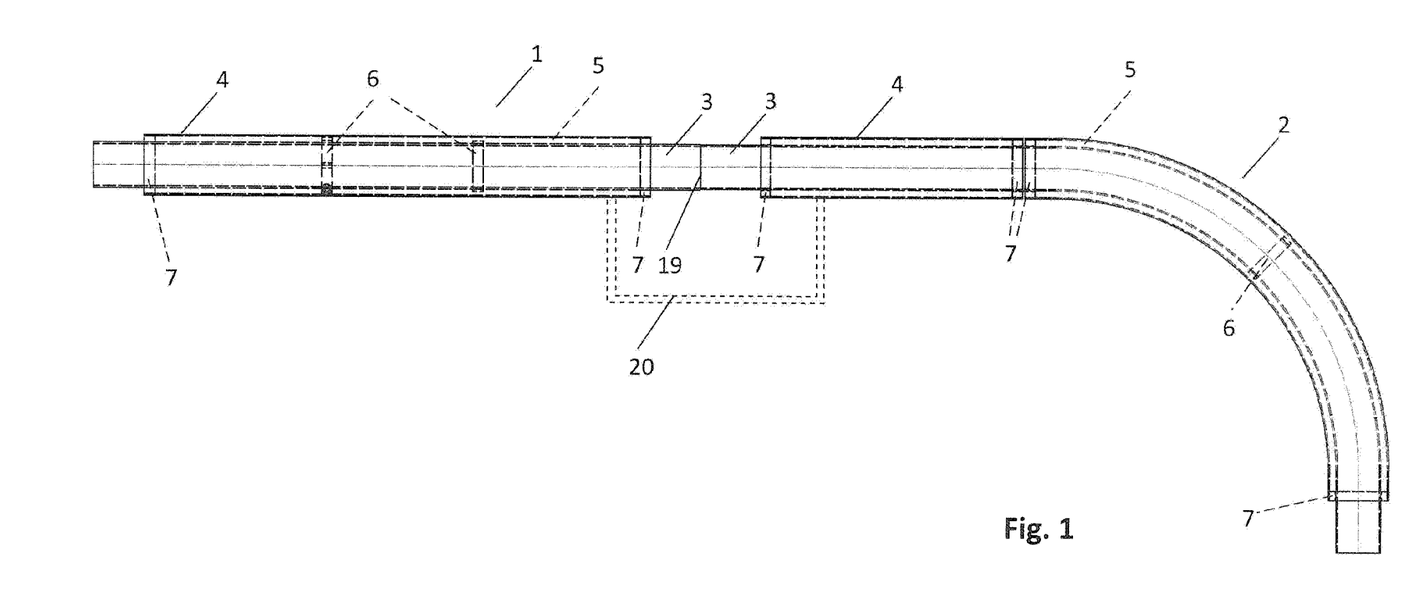
FIG. 1 in a side view two pipes according to the invention which are connected to each other and form a part of a conveying line.

The conveying line is comprised of individual pipes 1, 2. In FIG. 1, as an example a straight pipe 1 as well as a curved pipe 2 forming a pipe elbow is illustrated. The two pipes 1, 2 are connected to each other in a known way so as to be medium-tight. Each pipe is comprised of an inner pipe 3 that is surrounded at a spacing by an exterior pipe 4. Between the inner and the exterior pipes 3, 4, an annular space 5 is provided in which at least one support ring 6 that forms a spacer is arranged. Advantageously, across the length of the pipes 1, 2, several such support rings 6 are arranged at a spacing to each other. The support rings 6 are designed such that they do not close off the annular space 5 between the inner and the exterior pipes 3, 4.

At the ends of the exterior pipes 4 there are annular plugs 7 with which the annular space 5 is closed off seal-tightly at its axial ends.

Figure 2:
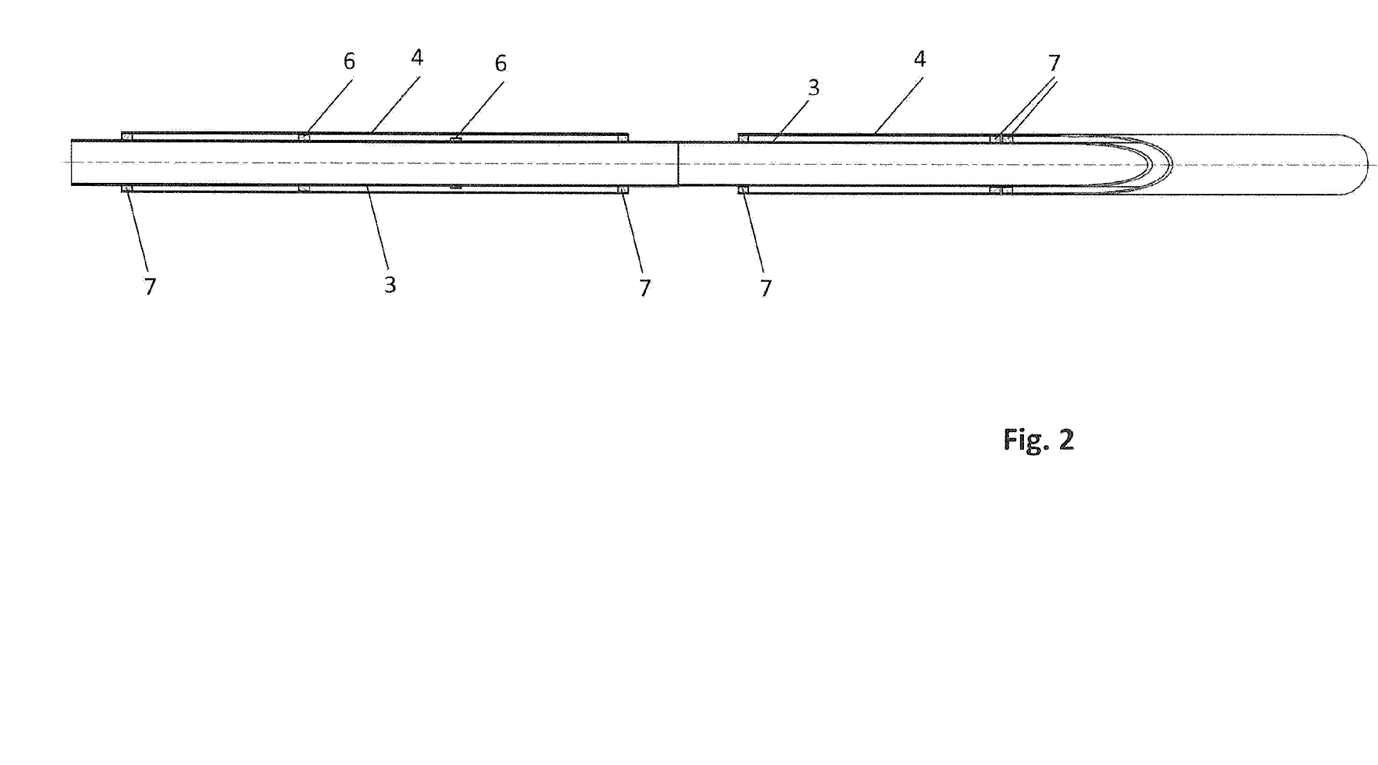
FIG. 2 an end view of the pipes according to FIG. 1.
Figure 3:
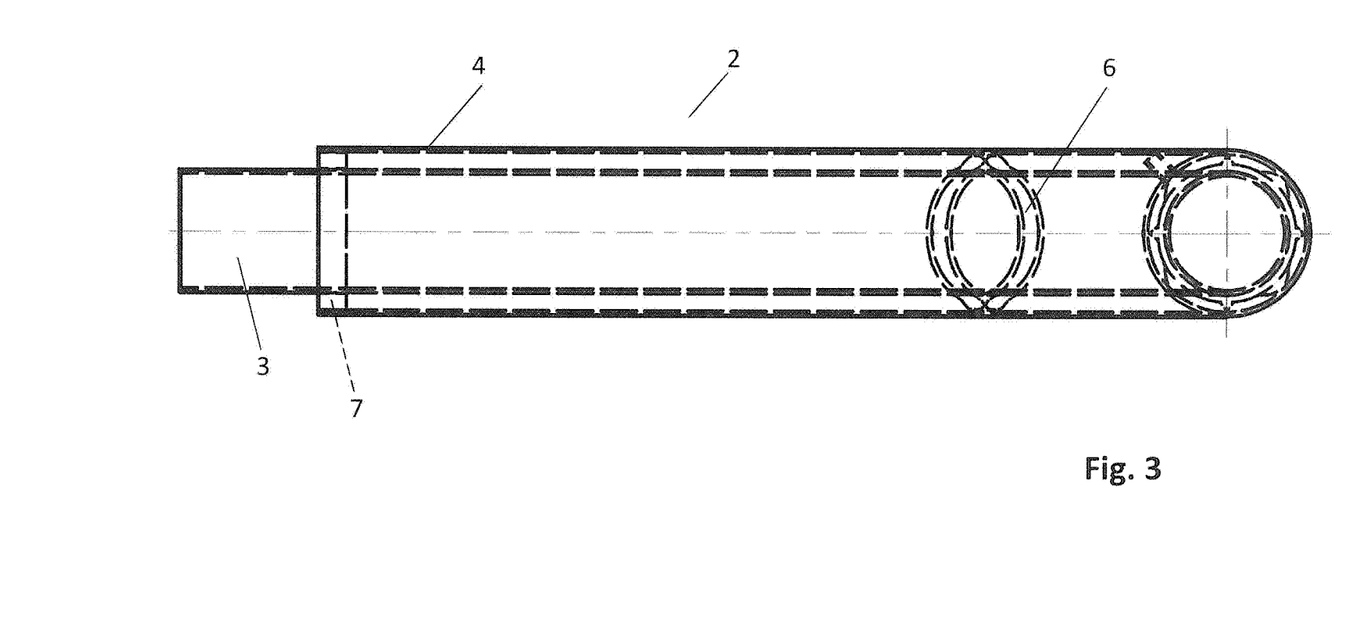
FIG. 3 in a detail illustration and in a front view a pipe elbow according to FIG. 1.
Figure 4:
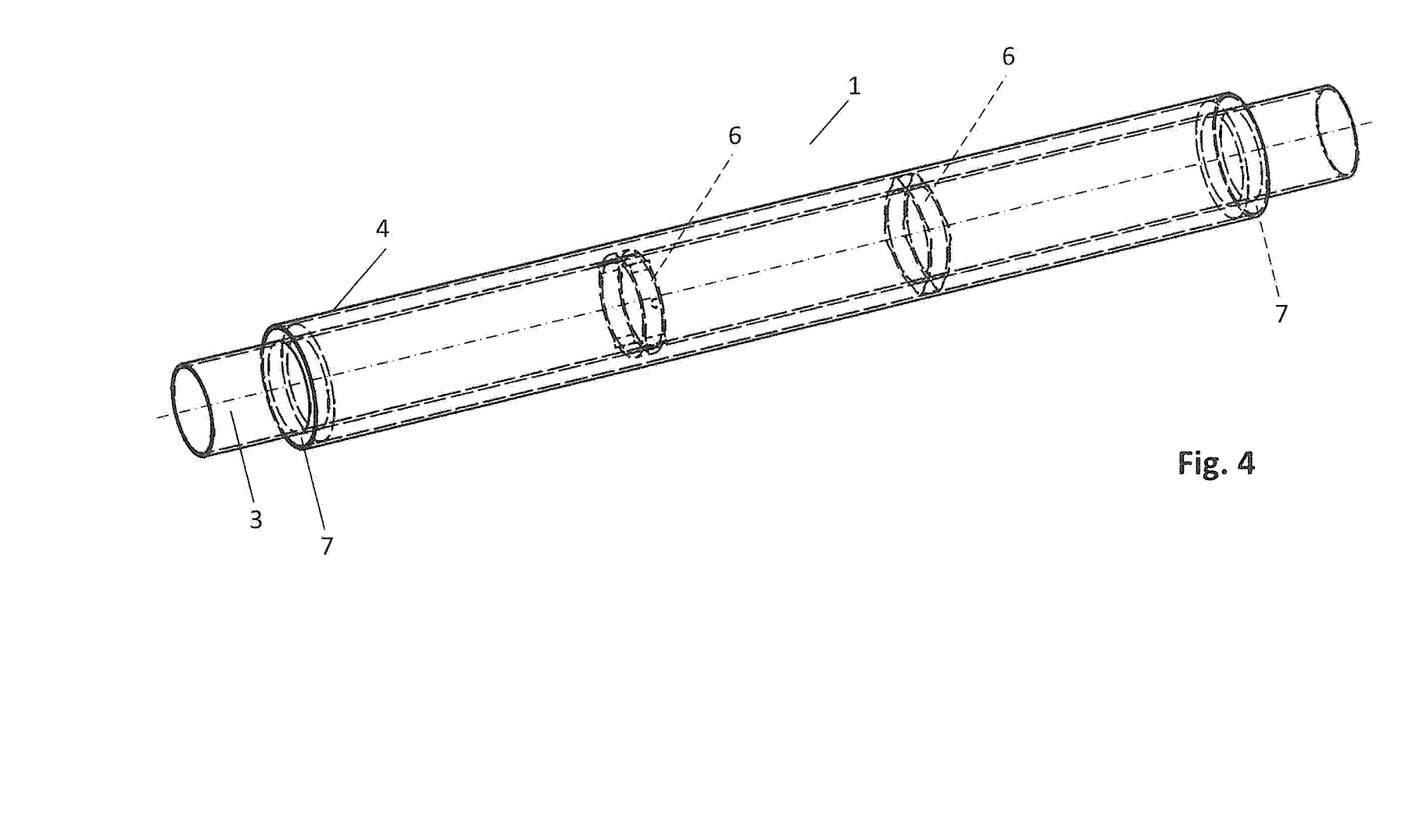
FIG. 4 in a detail and perspective illustration a straight pipe according to FIG. 1, FIG. 5 to FIG. 8 in radial section different embodiments of pipes, respectively.
Figure 12:
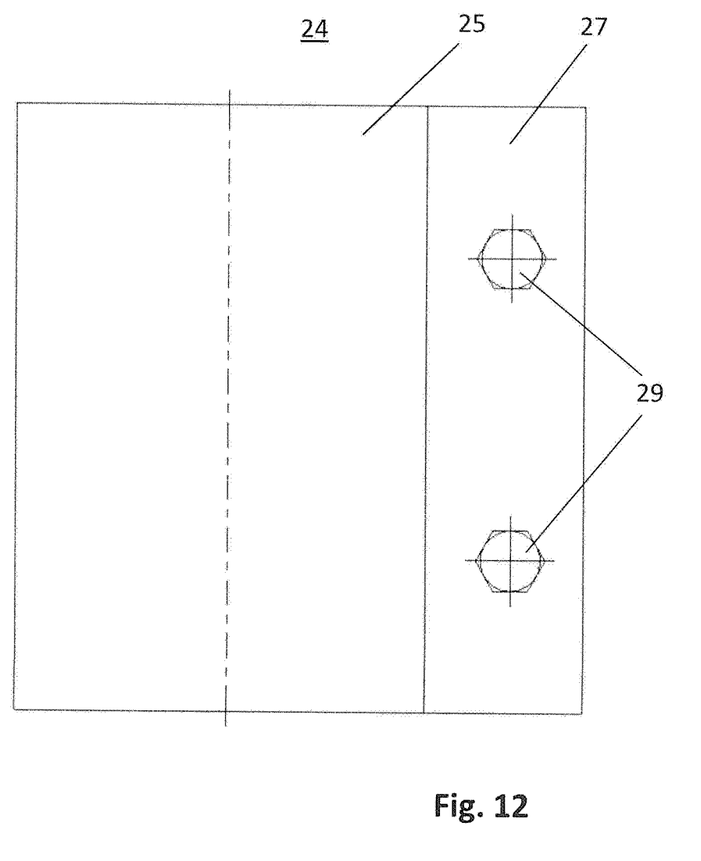
FIG. 12 a side view of a pipe coupling with which neighboring pipes are connected to each other.
Figure 13:
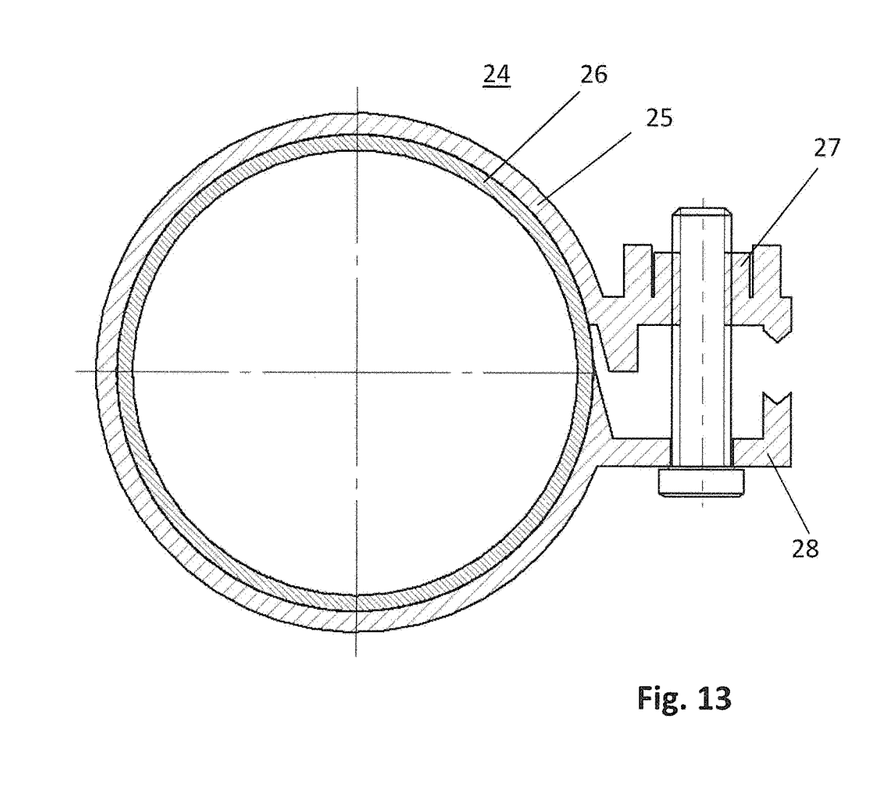
FIG. 13 the pipe coupling according to FIG. 12 in section.

The inner pipe 3 is longer than the exterior pipe 4 that is pushed onto the inner pipe 3 such that the inner pipe 3 projects past both ends of the exterior pipe 4 (FIGS. 1, 2, and 4). By means of these projecting ends of the inner pipe 3, neighboring pipes 1, 2 are connected to each other, advantageously by means of a pipe coupling 24 (FIGS. 12 and 13). The individual pipes 1, 2 can be produced in a very simple way. The required support rings 6 are pushed at uniform spacings onto the inner pipe 3.

They are designed such that they are seated with elastic pretension on the exterior wall of the inner pipe 3. Subsequently, the exterior pipe 4 is pushed across. As soon as the exterior pipe 4 has reached its required position relative to the inner pipe 3, the annular plugs 7 are pushed onto the inner pipe 3 at both ends and advanced so far that they close off seal-tightly the ends of the annular space 5.

The bent pipes 2 can be produced also in this way, inasmuch as they have a constant bending radius. For asymmetric inner pipes 3 with a short straight leg and a long straight leg connected to the elbow, the two-part exterior tube 4 is pushed on from the free end of the inner pipe 3, respectively. Accordingly, two plugs 7 are positioned adjacent to each other on the inner pipe 3 next to the elbow, as illustrated in an exemplary fashion in FIG. 1.

The individual pipes 1, 2 can thus be pre-manufactured in a simple way so that at the assembly site they must only be assembled by means of the pipe couplings 24. The inner pipe 3 with regard to its material and/or its inner wall configuration is matched to the type of medium to be conveyed.

The support rings 6 as well as the annular plugs 7 are seated fixedly on the inner pipe 3 as a result of their elastic pretension so that additional fastening means are not required. In particular the annular plugs 7 are seated with elastic deformation on the inner pipe 3 and are contacting with elastic pretension the inner wall of the exterior pipe 4.

The straight pipes 1 can have lengths of up to, for example, six meters. The bent pipe sections 2 can have large radii, for example, greater than 300 mm. By means of the pipe couplings, the individual pipes 1, 2 can be connected to each other in a simple and reliable way. The support rings 6 and the plugs 7 ensure that the exterior pipe 4 is positioned coaxial to the inner pipe 3. The spacing between the support rings 6 is, for example, one meter to 1.5 meters, depending on the required stability of the pipes. The annular plugs 7 at the ends of the exterior pipe 4 are comprised advantageously of rubber or elastic plastic material. In this way, the plugs 7 can be pressed in between the inner pipe 3 and the exterior pipe 4 with elastic deformation so that the annular space 5 at its two ends is closed off air-tightly.

Figure 5:
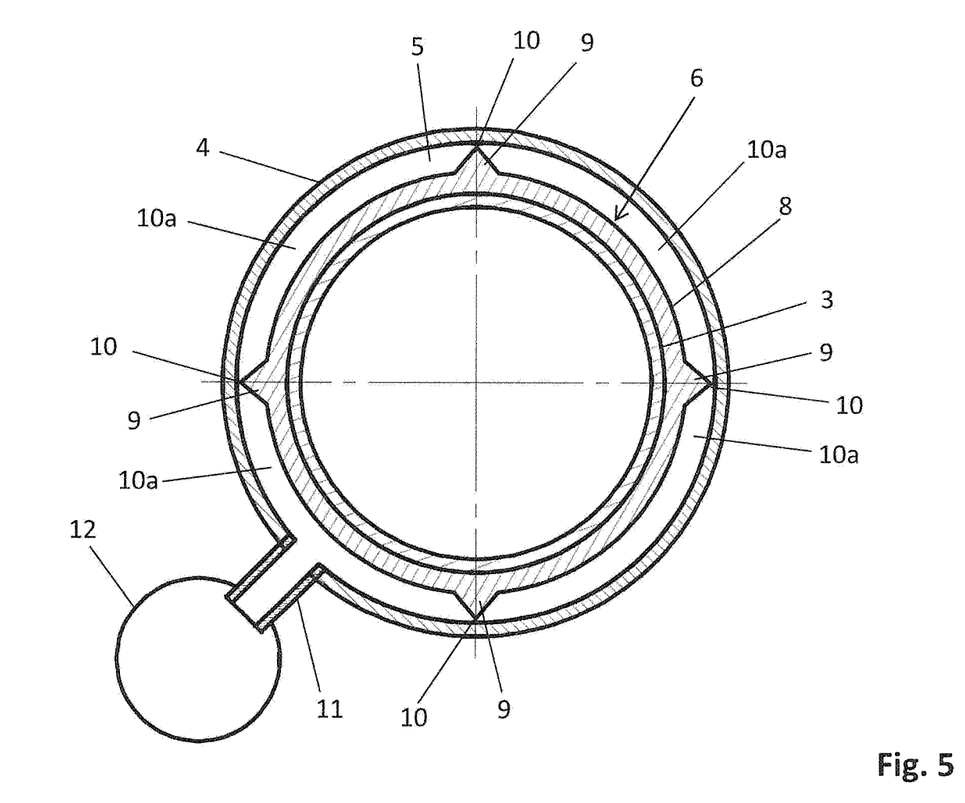

FIG. 5 shows a first embodiment of a support ring 6. It has an annular base body 8 which is seated with elastic pretension on the inner pipe 3. On its outer wall, the support ring 6 has projections 9 which are arranged at an angular spacing of 90° and extend across the axial width of the support ring 6. The projections 9 are of a triangular shape in radial section. The projections 9 are so tall that they are resting with their tip 10 with elastic deformation against the inner wall of the exterior pipe 4. As a result of this described configuration, the support ring 6 is provided with a 4-point support for the exterior pipe 4. Between neighboring projections 9 a sickle-shaped air gap 10*a* is formed, respectively.

A connector 11 for a measuring device 12 with which the pressure or the flow in the air gap 10*a* is detected opens into one of the air gaps 10*a*.

Figure 6:
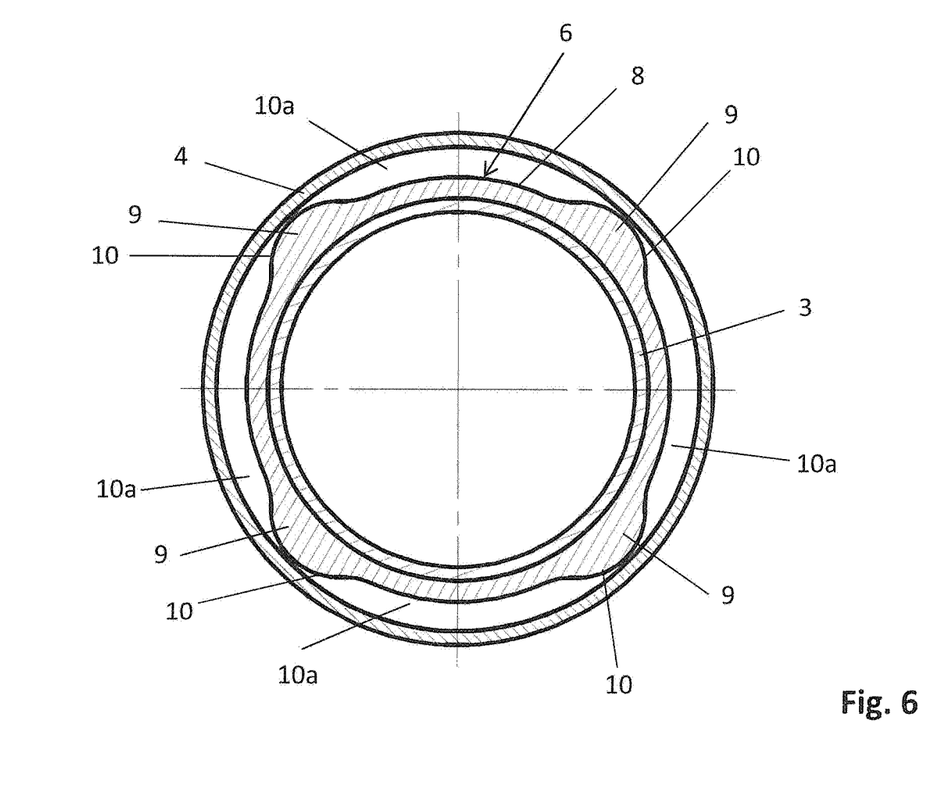

The support ring 6 according to FIG. 6 has also an annular body 8 with which the support body is seated with elastic pretension on the inner pipe 3. The projections 9 are projecting from the annular body 8 and, in contrast to the preceding embodiment, have a curved contact side 10. The projections 9 have an angular spacing of 90° and extend across the axial width of the support ring 6. The contact sides 10 are resting with elastic deformation against the inner wall of the exterior pipe 4 so that a 4-point support is provided by the support ring 6. Between the projections 9, the sickle-shaped air gaps 10*a* are also formed.

Figure 7:
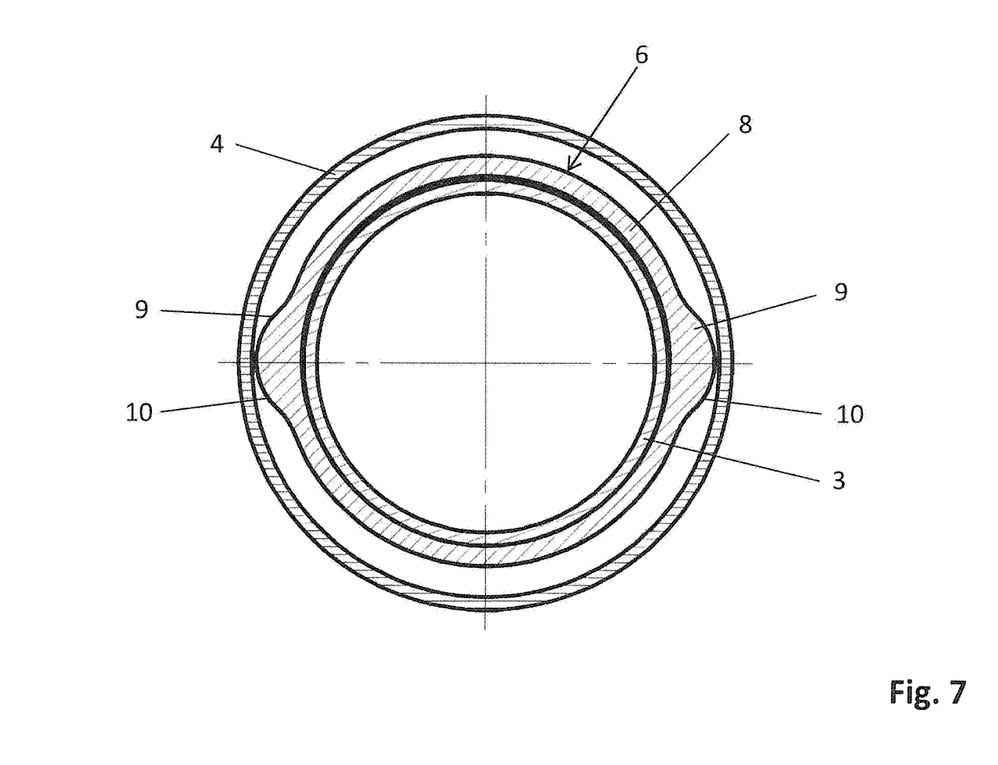

The support ring 6 according to FIG. 7 has only two projections 9 which are positioned diametrically opposite each other and in this embodiment have the same configuration as the projections according to FIG. 6. The projections are positioned with their arc-shaped contact side 10 with elastic deformation on the inner wall of the exterior pipe 4. The support ring 6 comprises the annular body 8 which is seated with elastic deformation on the inner pipe 3. A 2-point support of the exterior pipe 4 is achieved with this support ring 6.

In such a 2-point support, the projections 9 can also be designed in accordance with the embodiment of FIG. 5.

Advantageously, same support rings 6 are used for a pipe 1, 2. However, it is in principle also possible to provide within the annular space 5 different configurations of support rings.

Figure 8:
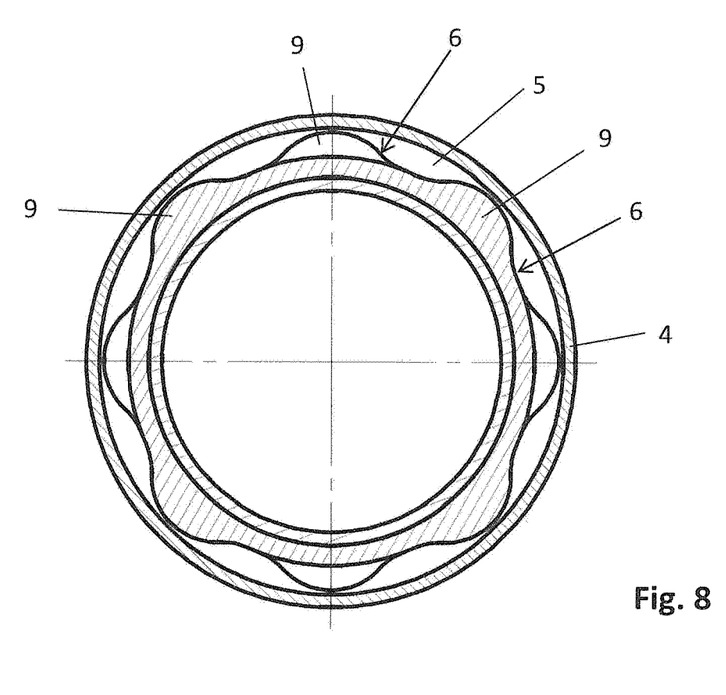

FIG. 8 shows in an exemplary fashion the situation that in the annular space 5 identical support rings 6 are arranged. In this connection, it is advantageous when neighboring support rings 6 are rotated relative to each other in such a way that, viewed in axial direction, between two projections 9 of one support ring a projection 9 of the neighboring support ring 6 is positioned, respectively. In this way, an advantageous support of the exterior pipe 4 across its length can be achieved.

It is however in principle also possible to arrange the support rings 6 with identical orientation sequentially behind each other within the annular space 5 so that the projections 9 of neighboring support rings 6 are aligned with each other, viewed in axial direction of the respective pipe.

Figure 10:
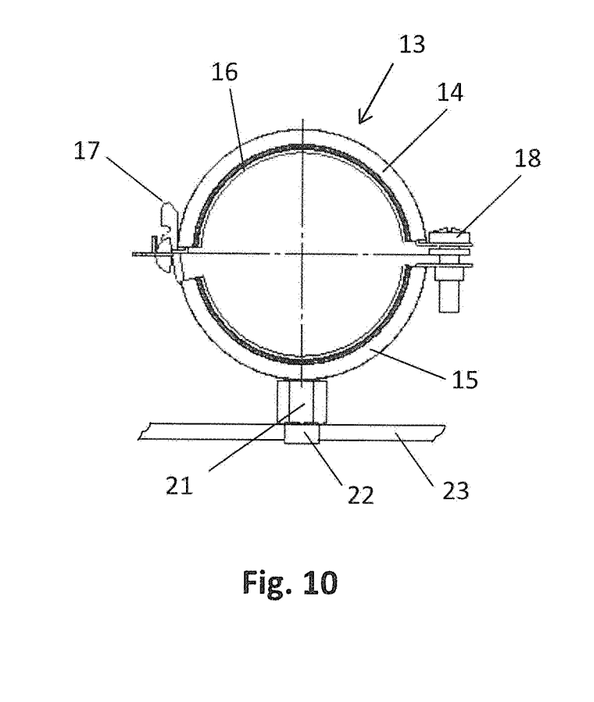
FIG. 10 a side view of a pipe clamp with which pipes are attached to a support structure, for example, a rail.
Figure 11:
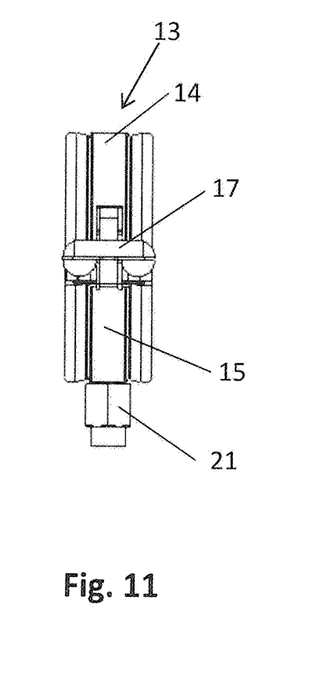
FIG. 11 the pipe clamp according to FIG. 10 in a front view.

FIGS. 10 and 11 show an example of a pipe clamp 13 with which the pipes 1, 2 can be attached on a support structure, for example, a rail. The pipe clamp 13 has two semi-circular clamping sections 14, 15 that surround the exterior pipe 4. The two clamping sections 14, 15 are provided on their inner side with at least one elastically yielding support 16 with which the pipe clamp 13 is resting on the exterior side of the exterior pipe 4. The support 16 can extend across the entire width of the two clamping sections 14, 15. However, it is also possible that, for example, two adjacently positioned supports 16 are provided. The clamping sections 14, 15 are connected to each other at their ends in the known way. In order to ensure a simple assembly, the pipe clamp 13 is provided as is known with a quick clamp system 17 that is known and therefore not described in more detail. The quick clamp system 17 connects the first ends of the two clamping sections 14, 15. The opposite ends of the two clamping sections 14, 15 are connected to each other by a clamping screw 18 with which the two clamping sections 14, 15 can be pulled tightly against each other. The support 16 comprised of elastically yielding material ensures an optimal noise reduction.

FIGS. 12 and 13 show an example of the pipe coupling 24 with which neighboring pipes 1, 2 can be connected to each other. The pipe coupling 24 has an elastically deformable sleeve 25 which is placed onto the two pipe ends in an abutment area 19 (FIG. 1) between neighboring pipes 1, 2. At the inner side of the sleeve 25 a soft and sealing seal ring 26 is attached with which the abutment area 19 is sealed off. Accordingly, the medium conveyed in the inner pipe 3 cannot escape to the exterior.

The sleeve 25 is designed like a clamping strap that surrounds the pipe ends about almost 360°. The two ends 27, 28 of the sleeve 25 are thicker and connected to each other by at least one clamping screw 29, in the embodiment by two clamping screws. The ends 27, 28 which are projecting transversely outwardly away from the sleeve 25 are pulled by means of the clamping screw 29 against each other so that the sleeve 25 is pulled tightly about the pipe ends.

The connection of the pipes 1, 2 with each other by means of the pipe couplings 24 is only one possibility, however the preferred one, for assembling the pipes 1, 2 to a conveying line. Neighboring pipes can also be connected to each other by other generally known connecting means.

The exterior pipe 4 surrounds the inner pipe 3 about most of its length. The annular space 5 present between the inner pipe 3 and the exterior pipe 4 is closed off at both of its ends by the annular plugs 7. The air volume which is contained within the annular space 5 can be utilized for detecting leakage of the inner pipe 3. When the inner pipe 3 is seal-tight, then the air volume within the annular space 5 is at a predetermined pressure which can be detected by the measuring device 12 (FIG. 5). The annular space 5 extends across the entire length of the exterior pipe 4 because the support rings 6 to not close of the annular space 5. The support rings 6 are resting only by means of their projections 9 on the inner wall of the exterior pipe 4.

Since a corresponding measuring device 12 is connected to each annular space 5, an unequivocal localization of a possible leak of the inner pipe 3 is ensured.

When the medium in the inner pipe 6 is conveyed by means of underpressure, a lower pressure is present in the inner pipe 3 than in the annular space 5. When the inner pipe 3 has a leak, the pressure in the annular space 5 decreases. This is detected by the pressure measuring device connected to the connector 11 and is indicated in a suitable way. The pressure loss is therefore an indication for leakage of the inner pipe 3 in the area of the monitored annular space 5.

In this way, each annular space 5 can be monitored by such a pressure measuring device so that leakages at the inner pipe 3 within the conveying line can be simply but reliably detected.

Pressure monitoring in the annular spaces 5 can be realized also by means of sensors which are arranged in the respective annular spaces. These sensors are coupled to a central device monitoring system. The transmission of the pressure data can be done wireless, for example, by radio signals, IR signals and the like. The arrangement is such that each individual pressure sensor can be detected and determined by the device monitoring system. In a danger situation, it can be determined in a simple way which pressure sensor has emitted the corresponding signal.

In case of leakage, the underpressure in the inner pipe 3 will propagate radially through the leakage site into the annular space 5. In this way, a pressure change in the annular space 5 between the inner pipe 3 and the exterior pipe 4 is generated. This pressure change occurs across the entire length of the annular space 5 because the support rings 6 are contacting only across small areas the inner wall of the exterior pipe 4. The sickle-shaped air gaps 10a between the support rings 6 and the exterior pipe 4 form the axial connection of the air volumes within the annular space 5. The connector 11 for the pressure measuring device 12 can therefore be arranged at any suitable location along the annular space 5 on the exterior pipe 4.

Leakage of the inner pipe 3 can also be determined by flow monitoring. In this case, a flow metering device is connected to the connector 11. By means of it, a leakage flow from the exterior into the annular space 5 is detected when the inner pipe 3 in the area of the annular space 5 has a leakage site and the medium in the inner pipe 3 is conveyed by underpressure.

In case of pressure conveying of the medium in the inner pipe 3, the leakage flow is reversed. In this case, is occurs from the annular space 5 to the exterior.

The air flow metering device detects this leakage flow and indicates it in a suitable way. Therefore, in a simple and reliable way a leakage site can thus be detected within the entire conveying line and can thus be eliminated early on.

Each one of the annular spaces 5 is provided in this case with such an air flow metering device so that each annular space 5 can be monitored. However, it is also possible to use sensors which are coupled with a central monitoring system. The air flow sensors send their signals advantageously wireless to the monitoring system. Data transmission can be realized, for example, by radio signals or IR signals. The monitoring system indicates the respective sensor which has detected a leakage. It is thus possible in a simple way to eliminate the occurring leakage within the inner pipe 3.

The conveying line is comprised in the afore described way of pipes 1, 2 that are connected to each other by means of the pipe couplings 24. The monitored annular spaces 5 are located between these pipe couplings so that the entire conveying line across its length can be monitored with regard to occurrence of leakage.

The double-wall pipes 1, 2 can be inexpensively and simply produced ready for assembly. The pipes can be connected to each other, like conventional pipelines, by means of pipe couplings 24. Leakage monitoring by means of the described pressure measurement or flow monitoring is simple and reliable. In a damage situation, the respective pipes can be simply exchanged.

The double-wall structure of the pipes 1, 2 has moreover the advantage that the noise emission in operation of the conveying line is significantly reduced as a result of the air cushion. Moreover, the support rings 6 and plugs 7 which are comprised of rubber or elastic material prevent that the structure-borne sound is transmitted from the inner pipe 3 directly onto the exterior pipe 4. The air volume in the annular spaces 5 ensures that between the inner pipe 3 and the exterior pipe 4 only air-borne sound is transmitted. The air-borne sound propagation can also be reduced in an advantageous way in that the annular spaces 5 are at underpressure or evacuated.

There is the possibility to fluidically connect the individual annular spaces 5 with each other. As indicated in FIG. 1 by dashed lines in an exemplary fashion, the annular spaces 5 of neighboring pipe sections 1, 2 can be connected to each other by a line 20. It can be, for example, a hose member which is connected to appropriate connectors of the exterior pipes 4 of neighboring pipes 1, 2.

Even in such a configuration, the unequivocal localization of the leakage site in the inner pipe 3 is possible also. In such a configuration of the conveying line, air flow metering devices are used as measuring devices. When leakage occurs, the air flow metering devices which are located in the area between the blower and the leakage site will respond while the downstream air flow metering devices which in the flow direction are behind the leakage site will not respond. This is so because at the leakage site a leakage flow from the exterior into the annular space 5 and from there through the leakage site into the inner pipe 3 occurs in the described way. From here, this air then flows in the direction toward the blower. Accordingly, in this embodiment, the leak can be localized unequivocally.

In use, the conveying line generates only a minimal noise level, with the annular spaces 5, the support rings 6, the annular plugs 7 as well as the pipe clamps 13 contributing to this. The pipe clamps 13 are positioned with their elastic supports 16, which serve for acoustic decoupling, on the exterior pipe 4. The pipe clamps 13 are attached in the known way to rails. For this purpose, the pipe clamps 13 (FIGS. 10 and 11) are provided with a projection 21 with which they engage an appropriate opening 22 of a tab-like holder 23 which, for example, is attached to a rail (not illustrated) or a different kind of support.

Figure 9:
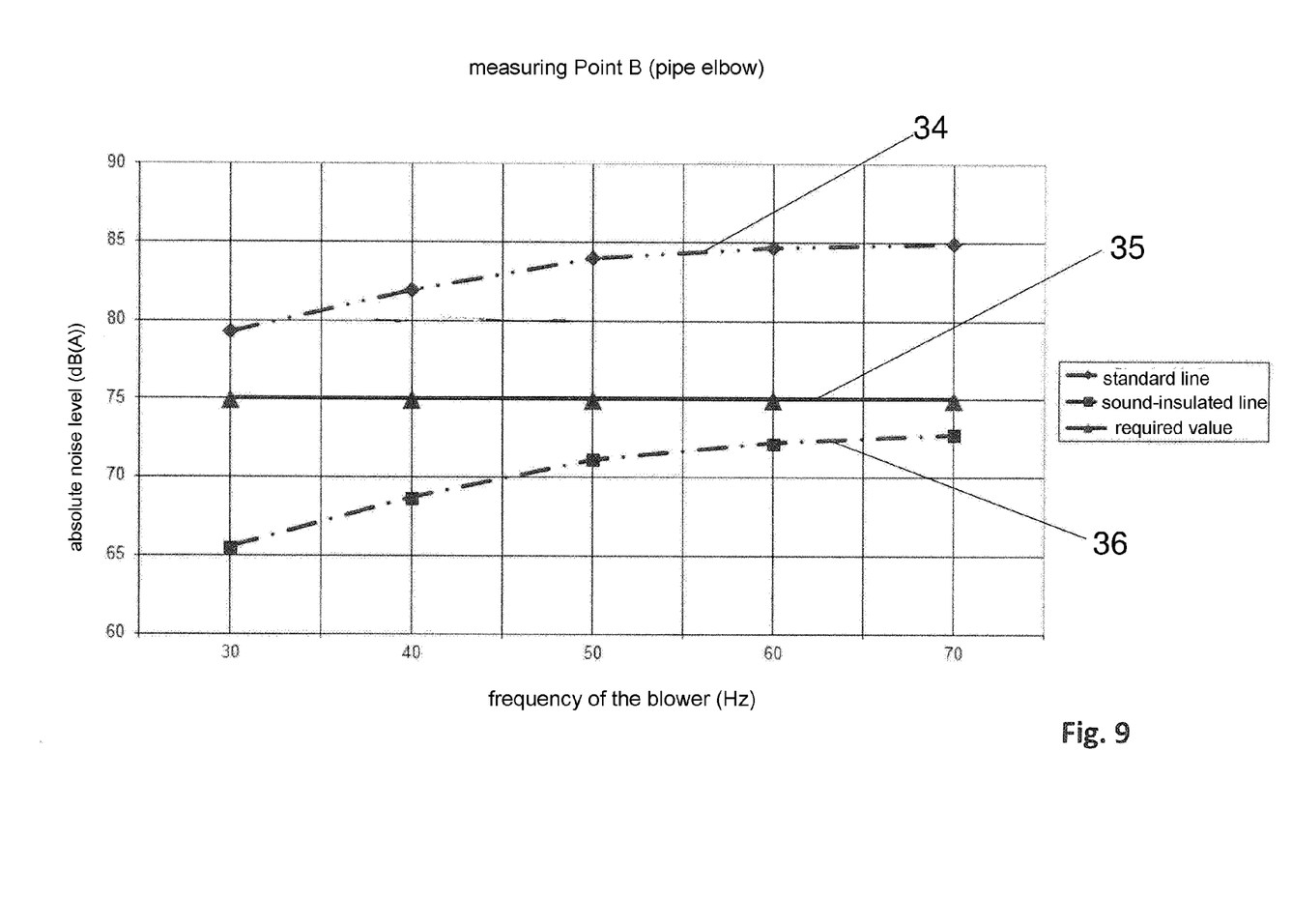
FIG. 9 the dependence of the sound level on the frequency of a blower for generating the conveying flow in the conveying line.

Noise level measurements have been performed on the conveying line. FIG. 9 shows the dependence of the absolute noise level on the frequency of the blower with which the conveying flow in the inner pipe 3 is generated. The diagram shows in this context the conditions in the bent pipe 2. The straight pipe 1 shows basically the same results.

The curve 34 shows the conditions for a conventional conveying line. The noise level increases with increasing blower frequency. In the measured example, the absolute noise level was observed for a frequency of 30 Hz at approximately 79 dB(A). At a frequency of 70 Hz, the noise level was at 85 dB(A).

In the illustrated example, a constant noise level of 75 dB(A) was required independent of the blower frequency; see curve 35. The curve 36 shows the course for pipe 2 of the conveying line. Across the measured frequency range, the noise level was always significantly below the required noise level curve 35. In the example, the noise level is approximately at 65 dB(A) for a blower frequency of 30 Hz. At a frequency of 70 Hz, the noise level was approximately at 73 dB(A).

A comparison of the noise level curves 34 and 36 shows that with the described conveying line an average reduction of the noise level by approximately 13 dB(A) is achieved in a very simple way.

Due to the described configuration of the conveying line, it is possible to retrofit already existing conveying lines. It is only necessary to push the exterior pipe 4 by means of the support rings 6 and the plugs 7 onto existing conveying pipes. For the exterior pipe 4, a material that is light with regard to weight, preferably aluminum, can be used. The noise reduction achieved in this way is moreover very cost efficient.

What is claimed is:

1. A pipe for a conveying line for conveying bulk material, the pipe comprising:
   an inner pipe;
   an exterior pipe surrounding the inner pipe, wherein the exterior pipe and the inner pipe are radially spaced apart from each other so that an annular space is formed between the inner pipe and the exterior pipe;
   a spacer arranged in the annular space between the inner pipe and the exterior pipe, wherein the spacer comprises a monolithic annular body and the monolithic annular body is seated with elastic pretension on the inner pipe;
   wherein the spacer centers the inner pipe and the exterior pipe relative to each other;
   wherein the spacer supports the exterior pipe by an at least 2-point support and reduces the noise level in operation of the conveying line.

2. The pipe according to claim 1, wherein the monolithic annular body comprises at least two projections projecting radially outwardly, wherein the at least two projections form the at least 2-point support on which the exterior pipe is supported.

3. The pipe according to claim 1, wherein the monolithic annular body is comprised of rubber.

4. The pipe according to claim 1, wherein the monolithic annular body is comprised of an elastic material.

5. The pipe according to claim 1, further comprising annular plugs, wherein the annular space has opposed ends and the annular plugs are inserted into the opposed ends of the annular space to close off the annular space at the opposed ends, wherein the annular plugs are made of rubber or an elastic material and are resting with elastic pretension against an inner wall of the exterior pipe and an exterior wall of the inner pipe.

6. The pipe according to claim 1, wherein the inner pipe projects in an axial direction of the pipe past the exterior pipe.

7. The pipe according to claim 1, further comprising at least one pressure sensor arranged in the annular space.

8. The pipe according to claim 1, further comprising a measuring device, wherein the exterior pipe has at least one connector to which the measuring device is connected.

9. The pipe according to claim 8, wherein the measuring device is a flow metering device.

10. A device for monitoring a conveying line in order to detect leakage, wherein the conveying line is assembled of pipes, the pipes each comprising an inner pipe and an exterior pipe surrounding the inner pipe, wherein the exterior pipe and the inner pipe are radially spaced apart from each other so that an annular space is formed between the inner pipe and the exterior pipe, respectively, wherein the annular spaces are distributed along the conveying line and the annular spaces each are closed off at opposed ends thereof by annular plugs, wherein the annular plugs are inserted into the opposed ends of the annular space, the annular plugs are made of rubber or an elastic material and are resting with elastic pretension against an inner wall of the exterior pipe and an exterior wall of the inner pipe, respectively, the device comprising measuring devices, wherein the annular spaces each are monitored by at least one of the measuring devices.

11. The device according to claim 10, wherein the measuring devices are pressure sensors arranged in the annular spaces.

12. The device according to claim 10, wherein the measuring devices are flow meters that detect a leakage flow in the annular spaces.

13. The device according to claim 10, further comprising a monitoring system, wherein the measuring devices are connected to the monitoring system.

14. A device for monitoring a conveying line in order to detect leakage, wherein the conveying line is assembled of pipes, the pipes each comprising an inner pipe and an exterior pipe surrounding the inner pipe, wherein the inner pipe and the exterior pipe are radially spaced apart from each other so that an annular space is formed between the inner pipe and the exterior pipe, respectively, wherein the annular spaces are distributed along the conveying line and the annular spaces each are closed off at opposed ends thereof, the device comprising measuring devices, wherein the annular spaces each are monitored by at least one of the measuring devices, the device further comprising conduits, wherein the annular spaces are in flow communication with each other by the conduits.

* * * * *